Aug. 15, 1939.                M. B. ADRIAN                  2,169,483
                X-RAY INSPECTION EQUIPMENT AND METHOD
                   Filed Aug. 17, 1938         4 Sheets-Sheet 1
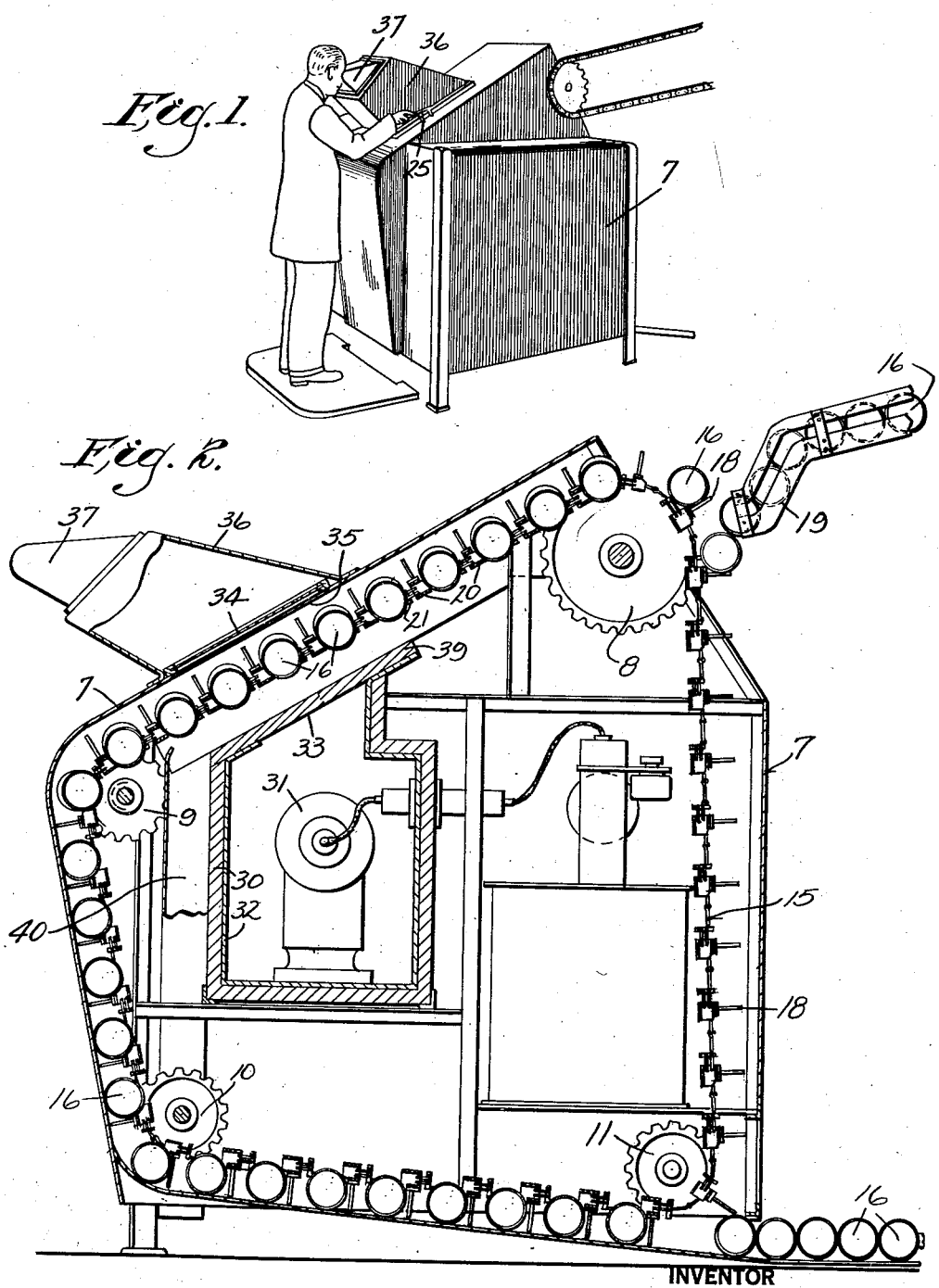
INVENTOR
Matthew B. Adrian
BY
Wheeler, Wheeler & Wheeler
ATTORNEYS Aug. 15, 1939.  M. B. ADRIAN  2,169,483
X-RAY INSPECTION EQUIPMENT AND METHOD
Filed Aug. 17, 1938  4 Sheets—Sheet 2

INVENTOR
Matthew B. Adrian,
BY
Wheeler, Wheeler and Wheeler
ATTORNEYS

Aug. 15, 1939.　　　M. B. ADRIAN　　　2,169,483
X-RAY INSPECTION EQUIPMENT AND METHOD
Filed Aug. 17, 1938　　　4 Sheets-Sheet 3

INVENTOR
Matthew B. Adrian,
BY
Wheeler, Wheeler & Wheeler.
ATTORNEYS

Aug. 15, 1939.     M. B. ADRIAN     2,169,483
X-RAY INSPECTION EQUIPMENT AND METHOD
Filed Aug. 17, 1938     4 Sheets-Sheet 4

INVENTOR
Matthew B. Adrian
BY
Wheeler, Wheeler & Wheeler
ATTORNEY

Patented Aug. 15, 1939

2,169,483

UNITED STATES PATENT OFFICE 2,169,483

X-RAY INSPECTION EQUIPMENT AND METHOD

Matthew B. Adrian, Milwaukee, Wis., assignor to X-Ray Shoe Fitters, Inc., Milwaukee, Wis., a corporation of Wisconsin Application August 17, 1938, Serial No. 225,397

18 Claims. (Cl. 250—52)

This invention relates to improvements in X-ray inspection equipment and methods. This application is a continuation in part of my former application, Serial No. 105,595, filed October 14, 1936, abandoned March 4, 1939.

My objects are to provide means for inspecting objects serially with minimum eye strain, whereby large numbers of objects may be inspected with less fatigue than heretofore and greater accuracy, particularly during the final portions of such periods; to provide for progressive inspection of images of approaching objects, in which the line of object movement, the character of the movement, the angle of vision, and the conditions under which the images are viewed, are more favorable to thorough inspection than heretofore; to provide means whereby continuously moving objects may be thoroughly inspected in rapid succession, and defective articles removed from the normal line of travel at the will of the inspector, and without interfering with the continuity of inspection; and in general to provide improved apparatus to facilitate X-ray examinations of various articles, which may be advancing either step-by-step or continuously, to be examined and sorted while concealed from view.

In the drawings:

Figure 1 is a perspective view of a machine embodying my invention, in a form suitable for inspecting canned goods.

Figure 2 is a sectional view of said machine, drawn generally to a vertical plane, which includes the axis of the conveyor or feedway.

Like parts are identified by the same reference characters throughout the several views.

Figure 3:
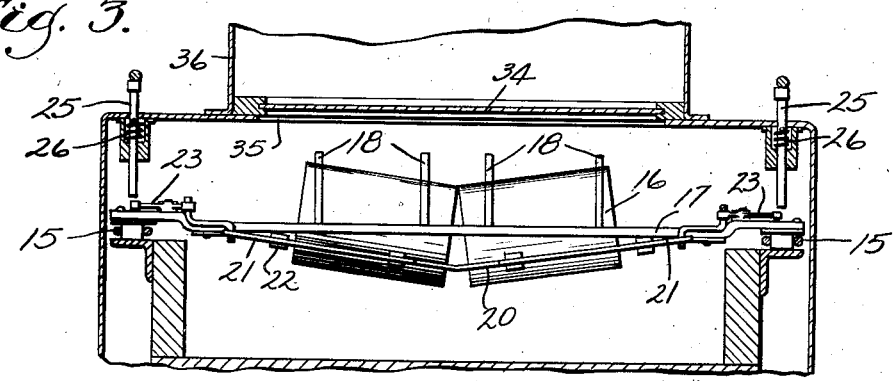
Figure 3 is a sectional view drawn to line 3—3 of Figure 2, and enlarged.
Figure 4:
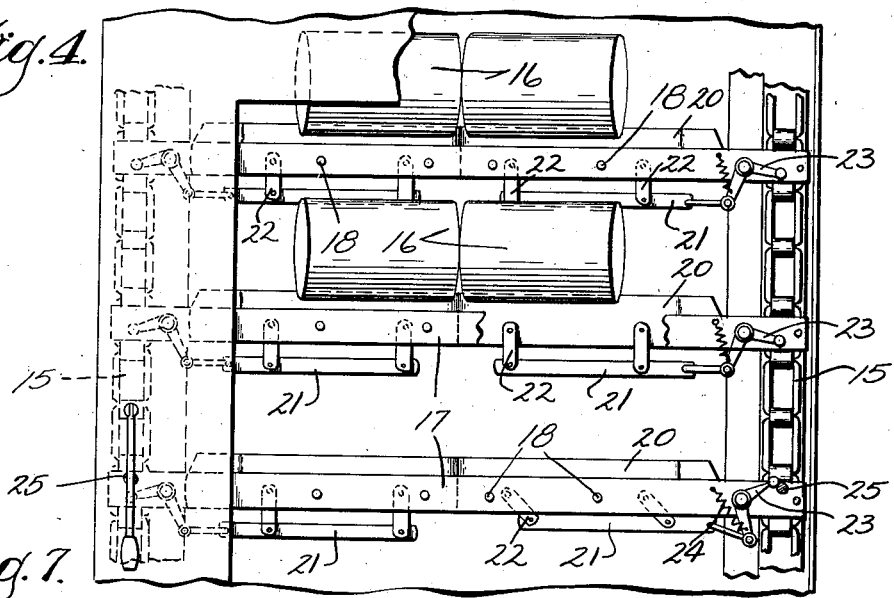
Figure 4 is a plan view of an enlarged fragment of the conveyor mechanism illustrated in Figures 2 and 3.

My improved machine is largely a combination of old elements, which I have reorganized and adapted to what I believe to be the wholly novel purpose of providing for prolonged inspection, with increased accuracy, minimum eye fatigue and improved facilities to enable the inspector to separate or discard defective articles or material without interrupting the inspecting operation or impairing its accuracy.

I have discovered that for certain purposes, inspection of images may be more accurate and involve less strain if the image of the moving object is advancing in a plane which includes the line of sight of the inspector and which is preferably inclined with reference to the line of vision. I find that eye fatigue is greatly reduced when the eyes are called upon to move only up and down and not greatly from side to side, and that each object or each portion of a stream of material can be inspected for longer periods and more accurately, but with less eye strain, than by the methods and apparatus heretofore employed.

In each embodiment of my invention, the articles or materials to be inspected are caused to move along a feedway between an X-ray tube 31 and a fluoroscopic screen 34 located in the path of the rays emanating from said tube, and upon which images of the moving objects may be presented and viewed, as the objects cross the inspection zone.

In the embodiment of my invention shown in Figures 1 to 4, inclusive, the articles to be inspected are delivered successively and singly, or in parallel rows, into a cabinet 7, which has driving sprockets 8 and idler sprockets 9, 10 and 11, over which operate conveyor chains 15, provided with means for supporting and conveying the articles to be inspected. Those portions of the conveyor chains which extend from the sprocket wheel 8 to the sprocket wheel 9 follow a downwardly and forwardly inclined path through the inspection zone. This path may be conveniently termed the feedway, since that term is equally applicable to the various modifications illustrated.

In Figures 1 to 4, inclusive, the conveyor is adapted to convey canned goods through the inspection zone, and at intervals slightly exceeding the width or diameter of the cans 16. These conveyor chains are connected by supporting bars 17, which may conveniently be provided with upstanding projections or pegs 18 to receive and support the cans in pairs.

Each pair of cans may have their axes either aligned or inclined with reference to each other.

The cans may be delivered to the machine through a chute 19 and received by that portion of the conveyor which moves upwardly across the delivery end of the chute and around the sprocket wheels 8.

The cans are initially received on the projections 18, but as soon as they pass the driving sprockets 8 they roll forwardly until they rest upon the rear margins of the supports 20 and the forward margins of cooperative retractible supports 21, the latter being pivotally connected by links 22 with the succeeding support 20 of the conveyor. The retractible supports 21 are individual to each can or other article to be carried, and are held in their normal supporting positions by bell cranks 23 and tension springs 24, as shown in detail in Figures 3 and 4.

At each side of the machine, and at a convenient distance from its front wall, I provide the top wall with manually depressible push rods 25, which are normally supported by compression springs 26, with their lower ends out of the paths of the bell cranks 23.

When one of these push rods is pressed downwardly by the operator, its lower end moves into position to engage the approaching bell crank 23, so that the forward movement of the conveyor 15 will bring that bell crank into contact with the depressed push rod. Thereupon the bell crank will be oscillated while clearing the push rod, and its oscillation will retract its associated can or object support 21, as shown at the right hand corner of Figure 4, and thereby drop its load through the conveyor. As soon as the push rod is relieved of downward pressure its spring returns it to normal position.

The conveyor being adapted for delivery of two rows of cans along the feedway, two push rods 25 are employed, as shown in Figure 3, one of these being in position convenient for operation by the right hand of the operator and the other in a position convenient for operation by his left hand. Each push rod may be operated by means of a pivoted lever 27 which overhangs the push rod, as shown in Figures 1 and 3.

Within the cabinet 7 I provide a suitable housing 30 for the X-ray tube 15. This housing will preferably have a lead lining 22, having a window opening 23 in its top portion through which the rays may pass from the tube 31 through the conveyor and the articles carried thereby to the fluoroscopic screen 34, thereby producing on the screen images of the articles in the zone traversed by the rays, which images will disclose to an expert inspector any imperfections in such articles.

The screen 34 is located above an opening 35 in the cabinet 7, and the space above the screen is partially enclosed by a hood 36, which constitutes a viewing chamber, and which excludes light from the exterior to any desired extent not interfering with a view of the images on the screen. In addition to the exclusion of light, the hood defines the inspector's station and determines his line of sight. Otherwise it is not material whether the inspector is shrouded.

The top of the cabinet 7 has an inclination corresponding generally with that of the feedway. The viewing chamber 36 extends in a more nearly horizontal direction from the top of the cabinet toward its front side. The fluoroscopic screen substantially bisects the angle at which the line of sight intersects the X-ray emanations through the center of the screen. Therefore, the images travel along the screen from its rear to its front margin substantially in a vertical plane through the line of sight, and the line of sight is most convenient for the operator since it has a slight downward inclination from the eyes to the screen.

This arrangement gives the operator a perfectly clear view of the images traversing the screen 34, since the distance is short and the eyes of the operator are out of line with the X-rays and are thus protected independently of the protection afforded by the screen itself. Also, the screen, as well as the operator's eyes, may be protected by the hood from extraneous light which might otherwise interfere with the clearness or sharpness of the image.

During the continuing movement of the conveyor 15 the cans or other articles which pass inspection are carried downwardly across the front of the machine between the conveyor and the front wall to a suitable point of discharge. They are preferably carried along the inclined bottom wall and discharged at the rear of the cabinet, as clearly shown in Figure 2. Articles which fail to pass inspection and are dropped through the conveyor as above described will be received on the inclined top board 39 of the tube housing 30, and will roll or slide down the incline to a discharge chute 40 leading to a different point of delivery.

Figure 5:
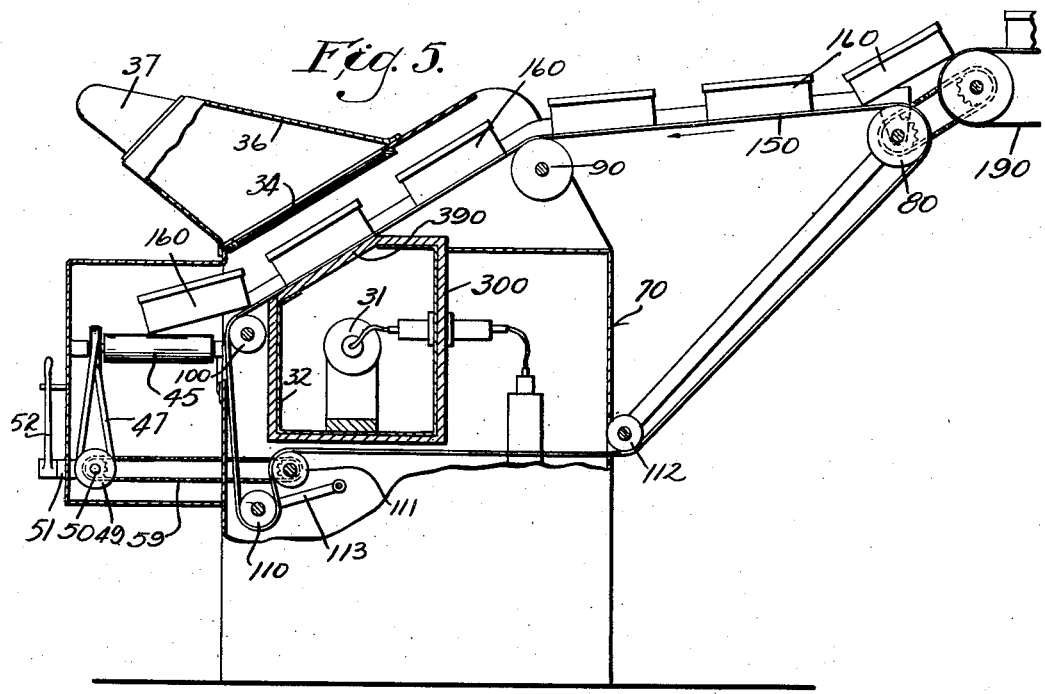
Figure 5 illustrates a modified embodiment designed for the inspection of cartons containing confections, or other solid or semi-solid materials, showing the same partly in elevation and partly in section.
Figure 6:
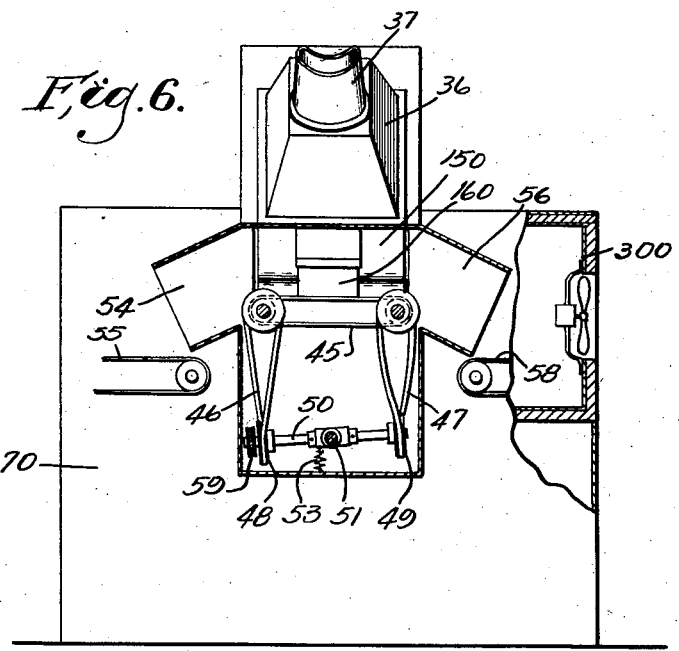
Figure 6 is a front view of the embodiment shown in Figure 5.

Figures 5 and 6 illustrate an embodiment of my invention used for the inspection of confections in their containers or cartons. The general arrangement is in many respects similar to that already described. The cabinet 70 contains a housing 300 for the X-ray tube 31. This housing has an inclined top wall 390 similar to the top wall 39 of the housing shown in Figure 2. The fluorescent screen 34 is forwardly and downwardly inclined as in Figure 4, and the viewing chamber or hood 36 and eye piece or sight opening 37 may correspond in structure to what is shown in Figure 1.

The cartons or containers 160 are delivered to the machine by a conveyor 190, which delivers them to a conveyor belt 150, which enters the cabinet 70 near its top and passes downwardly at an incline along the feedway extending between the fluorescent screen and the X-ray tube substantially as above described. The conveyor belt 150 is actuated by a driving pulley 80. It may be conveniently extended over the idler pulleys 90, 100, 110, 111 and 112. Pulley 110 is preferably carried by a lever 113 and serves as a belt tightener.

As the belt passes over pulley 100 at the lower end of the inspection zone, it delivers the containers successively to a short cross conveyor 45, which may be actuated alternatively under the control of the operator by driving belts 46 and 47 to reverse the direction of cross conveyor movement. These belts, respectively, operate over pulleys 48 and 49, mounted at opposite ends of a driving shaft 50, which has a supporting bar carried by a rock shaft or pintle 51 subject to oscillation by means of a hand lever 52 within convenient reach of the operator or inspector. A tension spring 53 connected with the shaft bearing normally holds the shaft 50 with pulley 48 sufficiently depressed to place belt 46 under driving tension and thus operate cross conveyor 45 in a direction to discharge the cartons 160 through a chute 54 to a conveyor 55. But whenever a box fails to pass inspection the operator may swing the handle 52 in a clockwise direction, as viewed in Figure 6, thus oscillating the rock shaft 51 and the associated driving shaft 50 against the tension of spring 53.

This raises pulley 48 and depresses the pulley 49 to release belt 46 from tension and place belt 47 under driving tension to reverse the movement of conveyor 45 and deliver the rejected cartons to a discharge chute 56 leading to the conveyor 58 which carries the rejects to a suitable point of disposal. The shaft 50 may be rotated from pulley 111 by a belt or chain 59.

Figure 7:
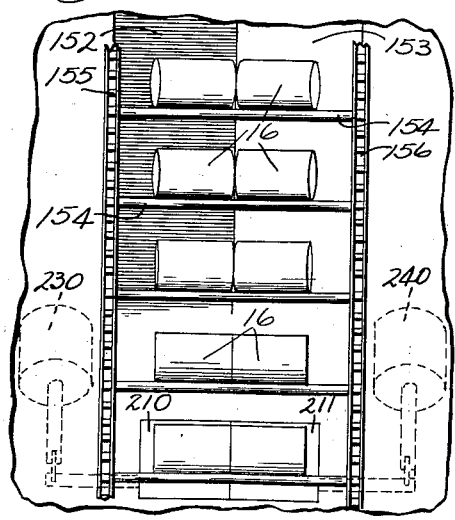
Figures 7 and 8 are plan and sectional views, respectively, showing modified means for conveying canned goods.
Figure 8:
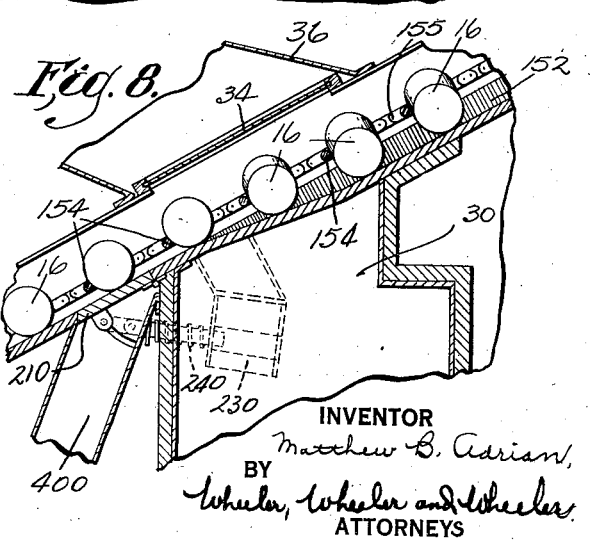

In the modified embodiment shown in Figures 7 and 8, articles such as the cans 16 are allowed to roll or slide at a speed regulated by the conveyor spacing rods 154 along the feedway floor members 152 and 153. In the upper portion of the inspection zone these floor members are preferably inclined toward each other to tilt the articles or cans 16 together, end to end, as they enter the inspection zone. In the lower portion of the zone these floor members may be brought into a common plane, thus providing for an end-to-end tilting movement of the cans while under inspection, whereby any slug of solder or other foreign solid in the contents of any can will be caused to move therein and thus make its presence more clearly visible in the image.

In their movement upon the feedway floor members 152 and 153, the movement controlling cross bars or rods 154 are advanced by the conveyor chains 155 and 156 to which the ends of these cross bars are connected. The spacing of the cross bars is preferably such that each bar will operate to control the movement of a single pair of cans, rolling or sliding upon its supported floor member. In this manner the pairs of cans are held substantially in a vertical plane common to their axes and their rate of movement through the inspection zone controlled.

Each of the feedway floor members 152 and 153 is provided with a trap door, indicated respectively at 210 and 211. Each trap door is controlled by a solenoid 230 and supporting springs 240, as shown in Figure 8. Energization of one of these solenoids will open the associated door and discharge any can in registry with the doorway while the door is open. The defective cans pass into the discharge chute 400.

In each form of construction herein disclosed it will be understood that the cabinet 7 will be of sufficient size to house apparatus for energizing the X-ray tube. Such apparatus is diagrammatically indicated in Figure 2, but not shown in detail because the details are not material to the present invention.

In each form of construction the work moves directly toward the operator along a vertical plane, which includes the axis of his line of sight, or is substantially parallel thereto. This feature of organization is exceedingly important for the reason that the successive images can be viewed for prolonged periods without material eye strain or fatigue, and the inspection of each image can be made with maximum accuracy because the images approching the eye and the angle at which the rays traverse the object is progressively changing in a vertical plane common to the line of approach and the line of vision.

Figure 9:
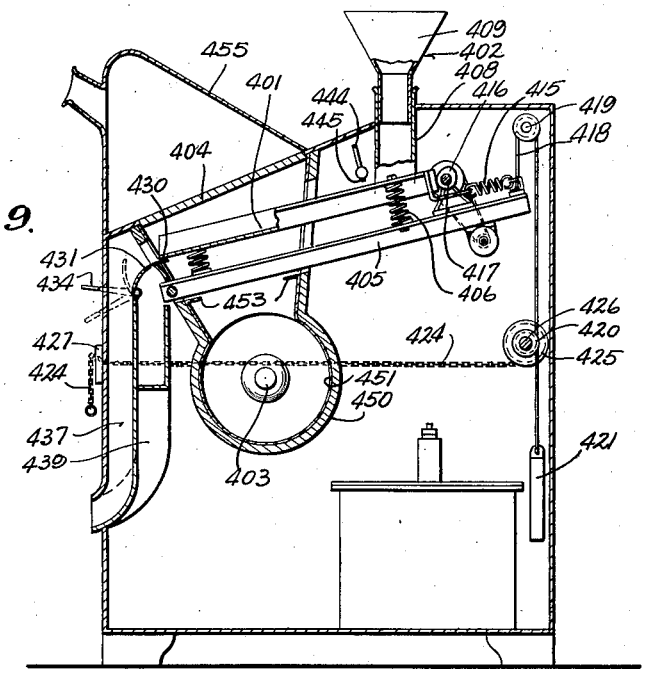
Figure 9 is a view similar to Figure 2, showing a further modification, including a vibratory chute.
Figure 10:
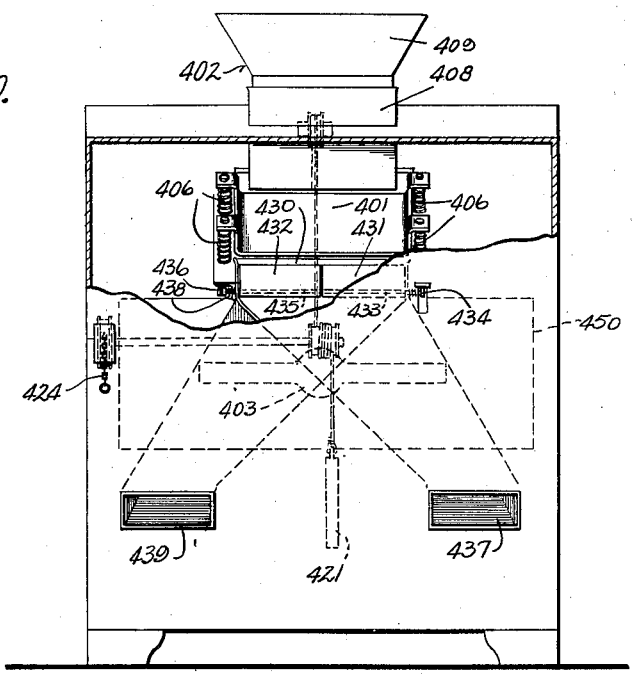
Figure 10 is a front elevation of the embodiment shown in Figure 9.

In Figures 9 and 10 I have illustrated a further modification, designed more particularly for the inspection of grain, meal, and similar materials delivered through the machine in bulk as a continuous or intermittent stream.

In Figures 9 and 10 I have illustrated a trough-like conveyor or feedway adapted to direct bulk material of either a dry or liquiform character through the inspection zone. For such purposes I prefer to employ an elongated shallow trough 401 which may be resiliently supported and actuated to provide a vibratory feedway. This trough extends downwardly and forwardly through the inspection zone from a receiving end underneath a hopper 402 through the space between an X-ray tube 403 and a fluorescent screen 404. The trough may be supported from a similarly inclined stationary frame 405 by a set of coiled compression springs 406. At its upper end the trough carries a chute section 408, into which the relatively fixed hopper chute 409 loosely depends.

The trough 401 may be vibrated longitudinally. Its upper end is connected with the frame 405 by a tension spring 415, and it is actuated in opposition to the spring by one or more rotary cams 416 mounted on a driving cross shaft 417. The cams cooperate with the spring to vibrate the trough and advance material step-by-step which does not tend to normally flow or slide down the feedway. The rate of advance may be predetermined in part by the speed of cam rotation and the contour of the cam, but it may also be regulated by varying the inclination of the trough.

The upper end of the trough is supported by a cable 418 which extends over a pulley 419, and after being wound upon a drum 420 is connected with a suspended counter-weight 421.

The drum 420 may be actuated from the front of the cabinet by a chain or cable 424 which is wound about pulley 425 connected with the drum shaft 426, and normally engaged with a suitable fastening device 427 on the front wall of the cabinet. The arrangement is such that by pulling upon the chain 424 the drum will be rotated in a direction to lower the upper end of the feedway frame 405 and raise the counterweight 421, whereas, when the chain 424 is released from the fastening 427 and allowed to wind on its pulley 425, the counterweight 424 will move downwardly and lift the connected end of the feedway frame 405. It is not material to the invention claimed whether the bottom of the trough is smooth surfaced or corrugated. Also, it is not essential that it be vibrated, and if vibrated, its motion may be longitudinal, vertical or lateral, the character of the vibration being largely determined by the material. This conveyor, as well as the chain conveyor or belts, will ordinarily have a downward inclination of about thirty degrees, the precise angle being also dependent upon the material to a considerable extent.

The lower end of the trough 401 is open to permit a normal discharge of material over a fixed guard plate 430 and one or more pivoted gates. In Figure 10 I have shown two gates or gate sections 431 and 432, respectively fixed to rock shafts 433 and 435 and oscillated by levers 434 and 436. These levers extend through slots in the front wall of the machine, with end portions exposed for manual operation. Each shaft may be urged toward normal position by a torsion spring 438.

When the gates are in their normal position, as shown by full lines in Figure 9, material will be directed into the discharge chute 437. When either of the operating levers 434 or 436 is depressed, its associated gate will be swung to the dotted line position and allow the material to fall into the chute 439.

It will be understood that retraction of either gate section will deliver into the chute 439 a cross section of the material which would otherwise pass over that section. It is therefore advantageous to sub-divide the gate into sections to avoid unnecessary waste. In some cases it is desirable that water or other liquid be delivered to materials which are being inspected. Such liquid may be delivered through a pipe 444 having outlets with or without spray nozzles 445 to direct the liquid into the trough 411 and the materials traversing the trough. Certain materials may thus be inspected while being washed or otherwise treated with liquid in aid of accurate inspection, or for the purpose of regulating the flow of material and its distribution in the trough.

The modification shown in Figures 9 and 10 also embodies features which are applicable to each of the other views as structural variations of similarly functioning parts. For example, the tube housing 450 is illustrated as a cylinder in Figures 9 and 10, and its lead lining 451 extends through a slot in the top of the cylinder wall and upwardly in hopper-like form to the fluorescent screen, its walls being provided with suitable openings for the conveyor trough 401 and its supports. These openings may be flanked by extensions 453 to intercept scattering or reflected X-rays.

Also, in Figure 9, the housing 455 has a substantially vertical front wall provided with a large opening through which the screen may be freely viewed, even though the head of the inspector is not in close proximity to the housing wall.

It will be understood that each and all of the conveyors or conveying means illustrated in the drawings will be composed of materials sufficiently permeable by X-rays to allow the production upon the screen of distinct images of such materials and extraneous matter therein.

The term "conveyor" is used in the appended claims generically as applied to all means for moving material at a desired or regulated speed through the zone traversed by the X-ray beam. Also, the terms "viewing chamber" and "sight opening" are used generically, since their form, size and shape are not material to the subject matter of the claims.

Also, in referring to the images as being subject to prolonged inspection, I have reference to the proportionate length of the viewing period with reference to the rate of travel, since the images move along a line of approach with corresponding increasing visibility of details.

Because of the comparatively slight downward inclination of the conveyor, the images approaching along the screen may be viewed with minimum shifting of the eyeballs of the inspector.

I claim:

1. Inspection apparatus comprising the combination with an X-ray tube and a screen spaced therefrom, of means defining a path for work movement between said tube and screen, and a housing for said tube provided with a viewing chamber extending forwardly from said screen and defining an operator's field of sight including said screen, said chamber having a sight opening so situated respecting said screen that said path and the major axis of the operator's field of sight from said opening to said screen are substantially in the same plane.

2. Inspection apparatus comprising the combination with an X-ray tube and a screen spaced therefrom, of a conveyor comprising means defining a path for work movement between said tube and screen, a cabinet enclosing said tube and extending beyond said screen to comprise a viewing chamber having a sight opening and defining an operator's field of sight in which said screen is disposed, said means extending substantially in a vertical plane from front to rear of said cabinet and including the major axis of said field of sight, whereby work moving on said path does not deviate appreciably to right or left of said axis during inspection.

3. Inspection apparatus usable in the X-ray examination of continuously movable work, said apparatus comprising the combination with an X-ray tube having its ray emitting portion directed upwardly, of a conveyor comprising means for guiding the work on an inclined path across said tube and through rays emitted therefrom, a screen inclined to the horizontal in substantial parallelism with said path on the opposite side of said path from said tube, and a viewing chamber provided with a sight opening through which said screen is visible in a direction having a substantial horizontal component, the major axis of the line of sight from said opening to said screen being disposed substantially in the same vertical plane as said path.

4. Inspection apparatus usable in the X-ray examination of continuously moving work, said apparatus comprising an X-ray tube having its ray emitting portion directed upwardly, a conveyor including means defining a work guiding path inclined across said tube in the path of rays emitted therefrom, and means for continuous movement of work along said work guiding path, a housing for said tube, a screen provided with means supporting it in proximity to said work guiding path at an angle to the horizontal in accordance with the inclination of said path, said screen being positioned to intercept X-rays emitted from said tube and traversing said path, and a viewing chamber extending from said screen and provided with a sight opening spaced from said screen in a direction such that a line drawn from said opening to a portion of said screen centered above the work guiding path will be in substantially the same plane as that in which said work guiding path is located.

5. X-ray inspection apparatus including the combination with a spaced tube and screen, of a conveyor including means for guiding successive pieces of work progressively and always in the same direction therebetween, said conveyor means including means for tilting each successive piece of work during its said progressive movement between the tube and screen, whereby to cause foreign matter in the work to become apparent during inspection.

6. X-ray inspection apparatus including the combination with a spaced tube and screen, of conveyor means including a work support extending transversely between the tube and screen and provided with laterally pitched portions of varying angle, and means for controlling the advance of work progressively and always in the same direction over said support between the tube and screen, whereby in traversing the varyingly pitched portions of said support the work will be tilted during inspection to render foreign matter in the work more clearly apparent.

7. Apparatus for X-ray inspection comprising the combination with an X-ray tube having an emission portion through which rays are directed, a housing for said tube comprising shielding relatively impenetrable by said rays, there being an opening in said shield for defining a path upon which said rays are directed, a screen disposed in said path at an acute angle to the major axis thereof, a conveyor including means defining a work guiding path transverse with respect to said ray emission path and between said tube and screen at an angle approximately corresponding to that of said screen, and a viewing chamber enclosing said screen and provided with a sight opening through which said screen is directly visible, a portion of said shielding intervening between said tube and sight opening whereby said sight opening is disposed outside of the path of ray emission at a point such that the major axis of the field of sight from said opening to said screen is at an acute angle to said screen and at an obtuse angle to the major axis of the path upon which rays are emitted, whereby an operator using said sight opening is protected from said rays but in a position for direct viewing of said screen.

8. Inspection apparatus comprising the combination with an X-ray tube having an upwardly directed ray emitting portion, of a shielding housing for said tube provided with an opening defining a path of ray emission upwardly therefrom, a screen disposed in said path and inclined to the horizontal, means for guiding work at a corresponding inclination directly beneath said screen and across said path, and a viewing chamber enclosing said screen and provided with a sight opening, said opening and screen defining a field of view of which the major axis lies substantially in the plane of the path of work movement and at an acute angle to said screen, said opening being wholly outside of the path of ray emission from said tube, and the major axis of said field of view being at an obtuse angle to the major axis of the path of ray emission, the inclination of said screen being such that said screen subdivides the angle between said axes.

9. Inspection apparatus comprising the combination with an X-ray tube having an upwardly directed ray emitting portion, of a shielding housing for said tube provided with an opening defining a path of ray emission upwardly therefrom, a screen disposed in said path and inclined to the horizontal, means for guiding work at a corresponding inclination directly beneath said screen and across said path, and a viewing chamber enclosing said screen and provided with a sight opening, said opening and screen defining a field of view of which the major axis lies substantially in the plane of the path of work movement and at an acute angle to said screen, said opening being wholly outside of the path of ray emission from said tube, and the major axis of said field of view being at an obtuse angle to the major axis of the path of ray emission, the inclination of said screen being such that said screen subdivides the angle between said axes, and work feeding means for controlling the continuous movement of work always in the same direction beneath said screen.

10. X-ray inspection apparatus including the combination of a spaced tube and screen, means for feeding materials successively along a line extending across the space between the tube and screen, and means for shifting the positions of the materials traversing the space between the tube and the screen to facilitate exposure of defects and foreign matter in such materials by variations in the images appearing on the screen.

11. X-ray inspection apparatus including the combination with a cabinet having its top provided with an inclined fluorescent screen, means for directing work material through the cabinet along a path proximate to the screen and substantially parallel thereto, means for shifting the materials step-by-step in a succession of movements along the line of advance, an X-ray tube within the cabinet having a housing adapted to direct its rays in a controlled beam intersecting the path of the materials and directed to said screen, and an exterior housing for the opposite side of said screen formed to define a line of sight extending to the screen obliquely to the path of the material and in opposition to the direction of its movement.

12. X-ray apparatus, including the combination of a suitable cabinet provided with means for feeding work therethrough, a fluorescent screen proximately parallel to the path taken by the work during a portion of its movement through said cabinet, X-ray means for producing moving images of the work upon said screen, a housing defining a line of sight extending obliquely to said screen in a plane which includes the line of image movement, and means controllable by an inspector while viewing such images for selectively separating portions of the work upon viewing the images of such portions on the screen.

13. Means for inspecting fluorescent images of moving work material including the combination of a fluorescent screen, a housing defining a line of sight extending convergingly to the screen along a line oblique to its surface, and means for directing an X-ray beam through moving pieces of work advancing across the beam on the opposite side of said screen to produce images moving along said screen along a line in a plane common to the major axis of the line of sight.

14. X-ray inspection apparatus, comprising the combination of a cabinet having adjacent its top a fluorescent screen inclined downwardly from rear to front, means for feeding work materials along parallel paths extending proximately underneath said screen and substantially parallel thereto, means for directing a beam of X-rays through work materials traversing said paths to produce images thereof traveling along said screen in correspondence with the movement of the work materials, a housing mounted on the top of the cabinet over said screen and extending forwardly to provide a viewing chamber through which the images traversing said screen may be viewed from the front side of the cabinet, and separating devices for the materials in each path adapted to direct certain portions thereof out of the normal line of travel after exposure of their images on the screen, the separating means applicable to the respective paths, including movable controlling members located at the respective sides of the housing in positions for manual operation by the inspector while viewing the images on the screen.

15. A method of X-ray inspection, consisting in moving materials to be inspected toward the inspector in vertical planes substantially corresponding to a vertical plane which includes his line of sight, and passing X-rays through the material to a fluoroscopic screen disposed transversely of said vertical planes and intersected by said line of sight.

16. A method of X-ray inspection, consisting in causing materials to be inspected to move in the direction of the inspector along a path inclined downwardly across his line of sight in the vertical plane in which said line of sight is substantially disposed, supporting a fluorescent screen above said path and directing an X-ray beam upwardly across the path of the materials to the under side of the screen for the production of images traveling on the screen in a general direction corresponding with that taken by the moving material and intersecting the inspector's said line of sight.

17. A method of X-ray inspection, consisting in moving materials to be inspected along an inclined feedway, partially shrouding a portion of the feedway to define a line of sight directed toward the materials advancing along said feedway and intersecting their path, interposing a fluorescent screen in said line of sight, and directing an X-ray beam through the materials to the under side of said screen to produce images thereon traveling in a plane which substantially includes the major axis of said line of sight.

18. A method of X-ray inspection which consists in producing a succession of X-ray images moving toward the inspector along a path which if extended would meet the inspector, said path intersecting a natural line of sight which is inclined from the inspector's eyes, said line of sight being in a plane which includes the line along which the images advance.

MATTHEW B. ADRIAN.